United States Patent
Tsuboi

[19]

[11] Patent Number: 6,044,230
[45] Date of Patent: *Mar. 28, 2000

[54] APPARATUS HAVING A BATTERY-SAVING FEATURE

[75] Inventor: Takayuki Tsuboi, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/763,445

[22] Filed: Dec. 11, 1996

Related U.S. Application Data

[63] Continuation of application No. 08/339,195, Nov. 10, 1994, abandoned.

[30] Foreign Application Priority Data

Nov. 15, 1993 [JP] Japan ..................................... 5-307033

[51] Int. Cl.[7] ........................................................ G03B 7/26
[52] U.S. Cl. ............................................................. 396/304
[58] Field of Search .............................. 396/6, 280, 301, 396/304

[56] References Cited

U.S. PATENT DOCUMENTS

| | | | |
|---|---|---|---|
| 4,240,021 | 12/1980 | Kashima et al. | 320/2 |
| 4,296,489 | 10/1981 | Mitsui | 368/205 |
| 4,328,456 | 5/1982 | Suzuki et al. | 320/7 |
| 4,337,529 | 6/1982 | Morokawa | 368/10 |
| 4,494,854 | 1/1985 | Yamaga et al. | 354/484 |
| 4,680,724 | 7/1987 | Sugiyama et al. | 364/708 |
| 4,703,161 | 10/1987 | Mclean | 235/1 D |
| 4,760,918 | 8/1988 | Washizuka et al. | 306/328 |
| 4,897,662 | 1/1990 | Lee et al. | 343/701 |
| 5,031,763 | 7/1991 | Lyhan | 206/214 |
| 5,245,171 | 9/1993 | Fox et al. | 235/492 |
| 5,337,099 | 8/1994 | Tasaka et al. | 396/6 |
| 5,402,204 | 3/1995 | Yoshimura | 354/484 |
| 5,424,800 | 6/1995 | Suzuki | 354/484 |

*Primary Examiner*—Safet Metjahic
*Assistant Examiner*—Michael Dalakis
*Attorney, Agent, or Firm*—Fitzpatrick, Cella, Harper & Scinto

[57] ABSTRACT

An apparatus adapted for use with a battery includes an insulation unit for providing an insulating state between the apparatus and the battery, and a releasing unit for releasing the insulation unit in cooperation with an operation relating to use of the apparatus and for maintaining thereafter the released state independently of the operation relating to the use of the apparatus. Alternatively, an apparatus adapted for use with a chargeable unit charged by a solar cell, includes an insulation portion for providing an insulating state between the solar cell and an operation circuit of the apparatus in a state in which the chargeable unit can be charged by the solar cell. A packing device is adapted for use with an apparatus which uses energy provided by a solar cell, the device includes a light provided by a transmission portion for providing a state in which external light can act on the solar cell when the apparatus is packed in the packing device.

35 Claims, 5 Drawing Sheets

APPARATUS HAVING A BATTERY-SAVING FEATURE

This application is a continuation of application No. 08/339,195, filed Nov. 10, 1994, now abandoned.

BACKGROUND OF THE INVENTION

1. Field of the Invention

The present invention relates to an improvement in an apparatus, more particularly, an electronic apparatus, such as a camera, in which, for example, electric power generated by a solar battery (or cell) is stored in a secondary (or chargeable) battery, such as a lithium-ion battery or the like, and the secondary battery is used as a power supply.

2. Description of the Related Art

In a conventional apparatus such as a camera, and the like, in which a primary battery is used as a power supply, or in which electric power generated by a solar battery is stored in a secondary battery, such as a lithium-ion battery or the like, and the secondary battery is used as a power supply, a usable state is generally provided for such apparatus by one of the following approaches:

1) After purchasing the apparatus, the user installs a battery provided with the apparatus into the apparatus.
2) Insulating material, such as paper or the like, is attached at a contact portion of a battery which has already been installed within the purchased apparatus, and the user removes the paper before using the apparatus.
3) A battery is incorporated in the apparatus, but orinary power consumption is so low that little electric power consumed before the apparatus reaches the user is.

However, the above-described approaches have the following problems:

In the above-described approach 1) in which the user installs a battery in the apparatus, an operation member, such as a battery cover or the like, must be provided, thereby causing additional battery installation operations for the user. Furthermore, countermeasures against, for example, misleading when a battery of a different kind is installed must be provided, thereby causing disadvantages from the viewpoints of production costs and space.

In the above-described approach 2) in which insulating material is attached at a contact portion of a battery, an openable/closable cover for taking out the insulating material must be provided, thereby also causing the problem of additional operations for the user.

In the above-described approach 3), the operability of the apparatus is excellent. However, if the product is stocked on the shelf for a long time, electric power consumed by a memory unit and a clock unit of an integrated circuit used in the apparatus is not negligible. Accordingly, when the product reaches a user, the remaining amount of the power supply is considerably reduced, and the user will be dissatisfied with the reduced number of operations which can be performed after starting to use the product.

SUMMARY OF THE INVENTION

According to one aspect, the present invention relates to an apparatus adapted for use with a battery, comprising insulation means for providing an insulating state between the apparatus and the battery, and releasing means for releasing the insulation means in cooperation with an operation relating to a start of use of the apparatus, and for maintaining thereafter a released state of said insulation means independently of an operation relating to a start of use of the apparatus.

It is thereby possible to prevent wasteful consumption of a power supply until the apparatus reaches a user, and to automatically start electric power supply to circuitry only by performing an operation necessary for the use of the apparatus when the user actually uses the apparatus, so that the apparatus can be immediately used without performing troublesome operations.

According to another aspect, the present invention relates to such an apparatus as the above-mentioned apparatus comprising a solar battery for charging the battery while the insulation means maintains the battery in the insulating state.

The solar battery can thereby charge the battery even if the battery performs self discharge while the apparatus is stored on the shelf for a long time.

An apparatus adapted for use with a battery, said apparatus comprising insulation means for providing an insulating state between the apparatus and the battery and releasing means for releasing the insulation means in cooperation with an operation relating to use of the apparatus, and for maintaining thereafter a released state of the insulation means independently of an operation relating to use of the apparatus.

An apparatus adapted for use with a chargeable unit charged by a solar cell, the apparatus comprising an insulation portion for providing an insulating state between the solar cell and an operation circuit of the apparatus in a state in which the chargeable unit can be charged by the solar cell.

A packing device adapted for use with an apparatus which uses energy provided by a solar cell, said device comprising a light transmissive portion for providing a state in which external light is incident on the solar cell when said apparatus is packed in said packing device.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

A description will now be provided of preferred embodiments of the present invention with reference to the drawings.

Figure 1:
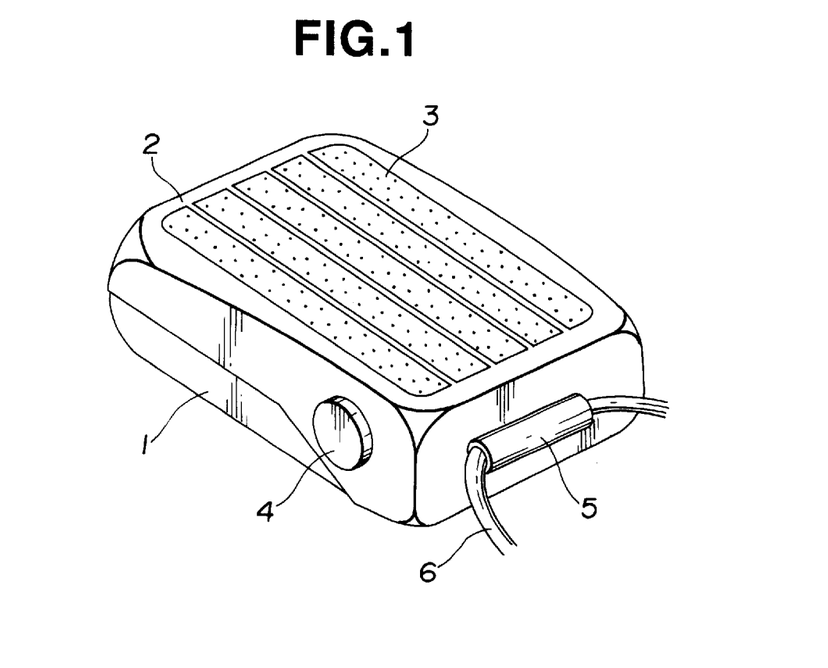
FIG. 1 is a perspective view illustrating a camera, serving as an electronic apparatus, according to a first embodiment of the present invention.

In FIG. 1, reference numeral 1 represents a main body of the camera, and reference numeral 2 represents a protective cover of the main body 1 of the camera. A solar battery 3 is disposed on the surface of the protective cover 2. Electric energy generated by the solar battery 3 is stored in a lithium-ion secondary battery (to be described later with reference to FIG. 4) within the main body 1 through an electric circuit (not shown). There are also shown an operation member 4 for operating the camera, and a mounting unit 5 for mounting a strap 6.

Figure 2:
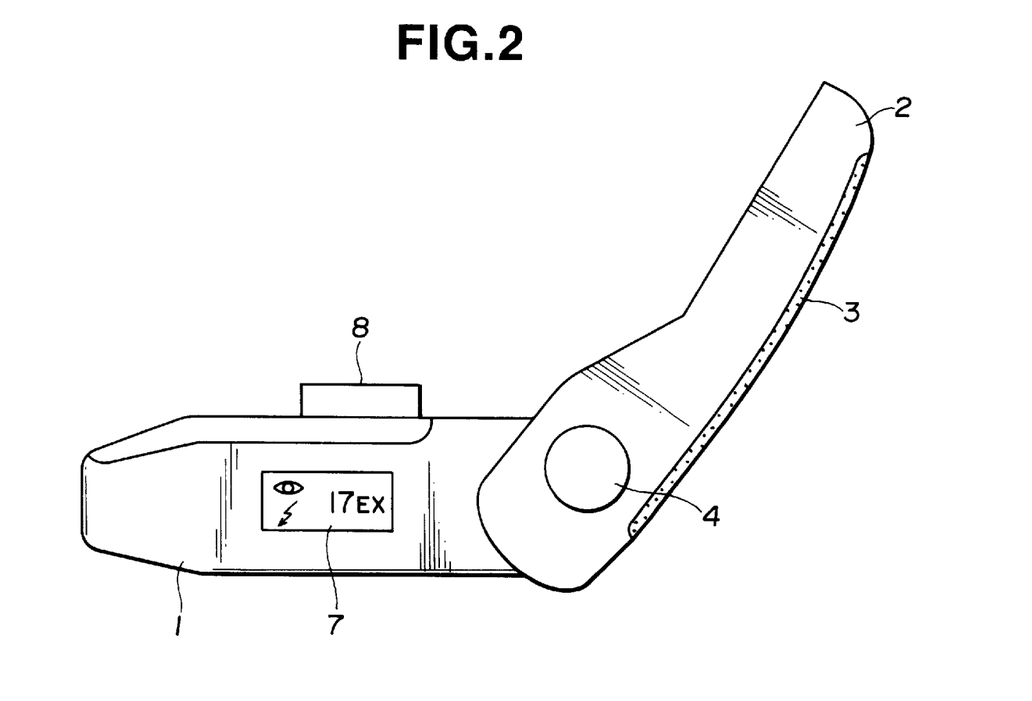
FIG. 2 is a side view illustrating a state in which a protective cover of the camera shown in FIG. 1 is opened.

FIG. 2 illustrates a state in which the protective conver 2 is opened from the accommodated state shown in FIG. 1. In this open state, a main switch (to be described later) is switched on to obtain a standby state of the camera. Thereafter, by operating, i.e., depressing, the operation member 4, an instructed operation is started.

Reference numeral 7 represents a display, such as a known liquid-crystal display, whose drive is controlled by a control circuit (to be described later), and which displays the state of the camera. In FIG. 2, the display 7 indicates that images have been photographed on frames up to the 17th frame, and a flash mode and a red-eye-mitigating mode are set. A lens barrel 8 incorporates a photographing lens.

If, for example, the apparatus instead constitutes a portable radio, the display 7 might indicate the state of the selected station, i.e., information relating to whether the selected station is an "FM station" or an "AM station", and information relating to the selected frequency range expressed in MHz or GHz.

Figure 3:
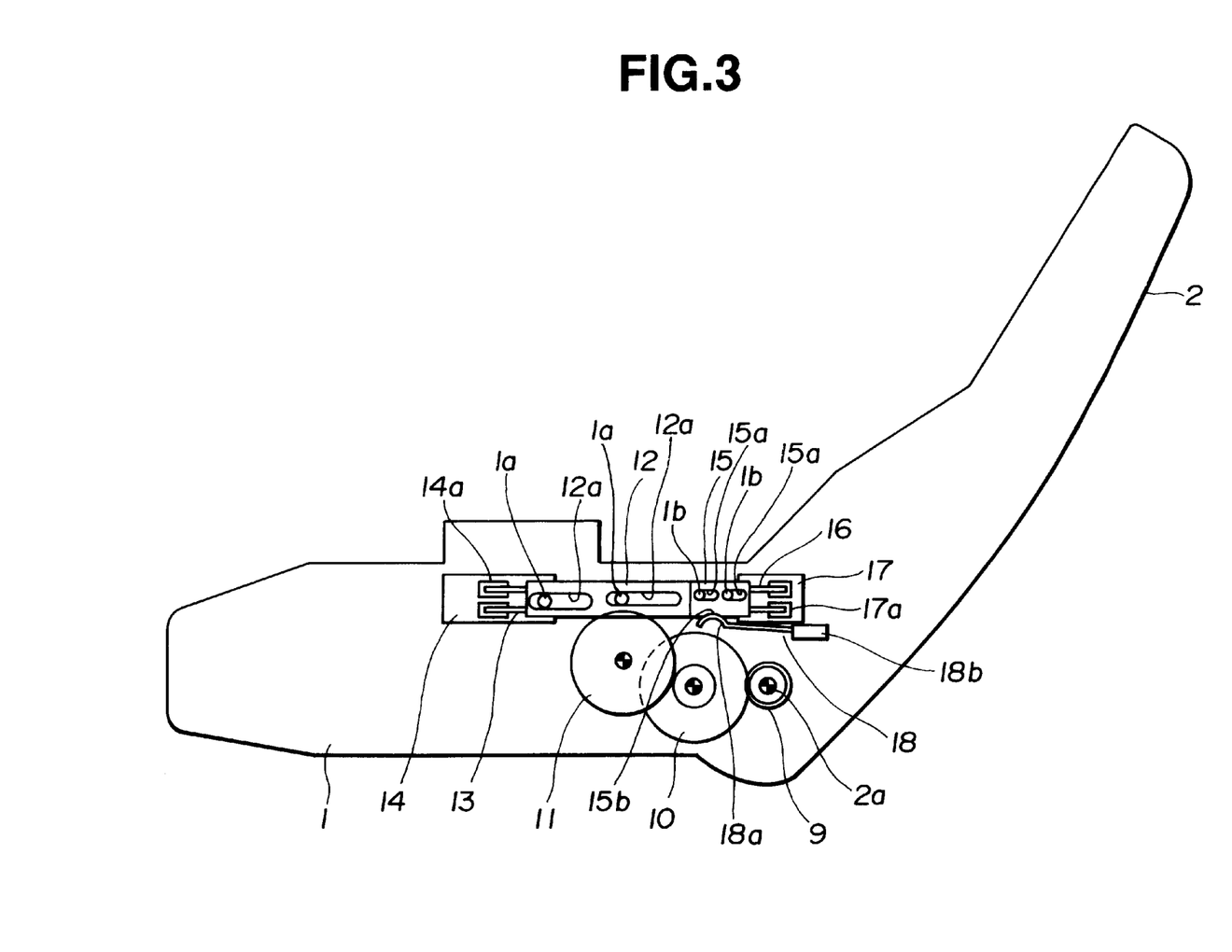
FIG. 3 is a partial-schematic side view illustrating the configuration of a principal portion of the camera shown in FIG. 2.

In FIG. 3, a gear 9 is fixed on a shaft 2a integrated with the protective cover 2, and rotates around the shaft 2a to transmit the motive power, produced when the protective cover 2 is opened, to gears 10 and 11. A rack portion (not shown) of a slide lever 12 meshes with the gear 11. A slit 12a of the slide lever 12 is fitted with a shaft 1a integrated with the main body 1 of the camera, so that the slide lever 12 is slidable toward the right and the left in FIG. 3. Armatures 13 are fixed to one end of the slide lever 12. When the armatures 13 contact pattern portions 14a provided on a switch substrate 14, which is fixed on the main body 1 of the camera, an operation-standby state of the camera is provided. That is, the armatures 13 and the switch substrate 14 constitute a main switch.

A latch lever 15 is provided at the other end of the slide lever 12. A slit 15a of the latch lever 15 is fitted with a shaft 1b, which is integrated with the main body 1 of the camera. When the slide lever 12 is pushed toward the right in FIG. 3, it causes the latch lever 15 to slide toward the right. In the open state of FIG. 3, the slide lever 12 has been slid toward the right in accordance with an operation of opening the protective cover 2 from a closed state, so that the latch lever 15 is pushed toward the right by the slide lever 12, and a click groove 15b of the latch lever 15 engages a click portion 18a of a click plate 18 (to be described later) and is latched at this position.

Armatures 16 are fixed to one end of the latch lever 15. When the armatures 16 contact pattern portions 17a provided on a switch substrate 17a, which is fixed on the main body 1 of the camera, electric power is supplied to the circuits on the camera. That is, the armatures 16 and the switch substrate 17a constitute a power-supply switch (to be described later).

Accordingly, in the above-described state in which the protective cover 2 is opened from the closed state, as the aramtures 16 contact the pattern portions 17a of the switch substrate 17, i.e., the power-supply switch is switched on, to supply electric power to a control circuit of the camera. Even if the protective cover 2 is closed again from this state, only the slide lever 12 moves toward the left in FIG. 3, and the latch lever 15 is maintained in the state of FIG. 3. Thereafter, the power-supply switch remains switched on.

An end portion 18b of the click plate 18 is integral to the main body 1 of the camera. As described above, the click portion 18a, which utilizes a spring force of a leaf spring, engages the click groove 15b of the latch lever 15 in the state of FIG. 3, so that the latch lever 15 is held at this position.

Figure 4:
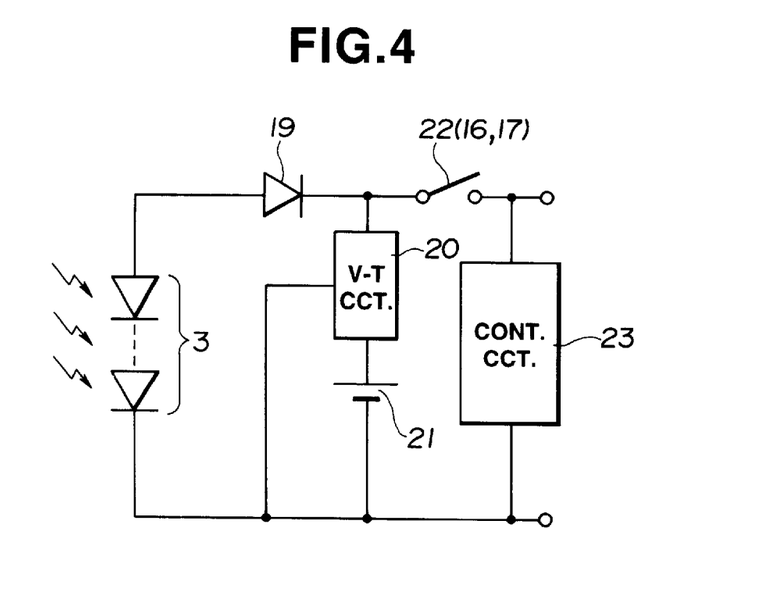
FIG. 4 is a circuit diagram illustrating the configuration of the arrangement of a solar battery and a secondary battery of the camera shown in FIG. 1.

In FIG. 4, there are shown a diode 19 for preventing a reverse flow of energy generated by the solar battery 3, and an overvoltage/overcurrent protection circuit 20. A lithium-ion secondary battery 21 stores energy generated by the solar cell 3 via the diode 19 and the overvoltage/overcurrent protection circuit 20. A power-supply switch 22 comprises the armatures 16 and the switch substrate 17a. Electric power is supplied from the lithium-ion secondary battery 21 to a control circuit 23 of the camera by switching on the power-supply switch 22.

Figure 5:
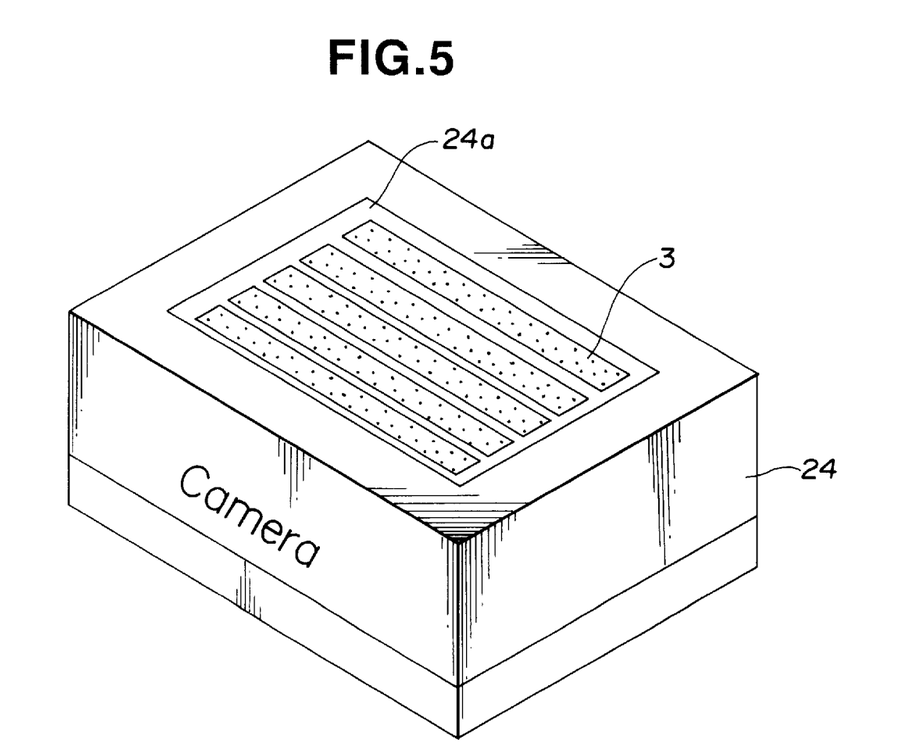
FIG. 5 is a perspective view illustrating a state in which the camera shown in FIG. 1 is accommodated within a packing box.

In FIG. 5, reference numeral 24 represents a decorative packing box for the camera. A surface of the packing box 24 facing the surface of the solar battery 3 disposed at the upper surface of the protective cover 2 of the camera is made of a transparent plastic film 24a. A hole having the same shape as the transparent plastic film 24a is opened in a surface of a styrol-foam cushioning material (not shown) facing the solar battery 3 incorporated within the packing box 24, so that, as shown in FIG. 5, external light can be directly incident upon the solar cell 3.

In the above-described configuration, about 50% of electric power is charged in the lithium-ion secondary battery 21 disposed in the camera when the camera is being shipped in the packing box.

In this state, as shown in FIG. 4, since the power-supply switch 22 is switched off, i.e., the armatures 16 and the pattern portions 17a of the switch substrate 17a are in a non-conducting state, current from the lithium-ion secondary battery 21 does not flow into the control circuit 23 of the camera. Accordingly, only the self-discharging current of the lithium-ion secondary battery 21 contributes to power consumption.

Since the rate of self-discharge of the lithium-ion secondary battery is about 5%/year in such an apparatus, for example, the rate of self discharge of the lithium-ion secondary battery 21 charged to 50% equals about 5%×50% =2.5%/year. Hence, even if the apparatus is stored for a few years, electric power of at least 40% of the full power remains in the secondary battery 21. Accordingly, the camera delivered to a user can be used immediately.

Furthermore, as shown in FIG. 5, since charging from the solar battery 3 can be performed in the packed state, energy greater than the above-given value may be stored. Even when the camera has been stored for a time period longer than the above-described time period, sufficient energy can be charged by exposing the product to external light, such as in a shop window, one or two days before it is sold.

The user who has purchased the apparatus removes the apparatus by opening the packing box 24 (in the state of FIG. 1, where the power-supply switch 22 is switched off), and then opens the protective cover 2 as shown in FIG. 2.

At that time, as described above, the slide lever 12 is slid to switch on the power-supply switch 22, comprising the armatures 16 and the switch substrate 17a, as well as the main switch, comprising the armatures 13 and the switch substrate 14. Thus, electric power is supplied from the lithium-ion secondary battery 21 to the control circuit 23 of the camera.

In this state, the user performs preparatory operations for the practical use of the camera, such as setting of an incorporated quartz clock for providing a date (a clock or a timer in the case of a radio), and the like. After completing these operations, which may be necessary, of course, for some apparatuses, the operator can confirm the operational state of the camera, for example, from the display unit 7 by depressing the operation member 4 (as well as a photographing operation by depressing the operation member 4). At that time, as described above, since electric power has already been supplied to the control circuit 23, the camera operates normally.

If the user closes the protective cover 2 to return to the initial state after use, the slide lever 12 is slid toward the left in FIG. 3. Accordingly, a non-conducting state (in which the main switch is switched off) between the armatures 13 and the pattern portions 14a of the switch substrate 14 is provided to disconnect the standby mode. On the other hand, the latch lever 15 is held in the same state, and the power-supply switch 22 remains switched on. Hence, in the camera, only the clock function within the control circuit 18 and a portion of the microcomputer assume an operating state (a holding state), so that current flow equals about 2 μA–10 μA.

Even with the above-described small amount of current flow, there is the possibility that the electric power of the lithium-ion secondary battery 21 charged to 50% may be used up in the course of a few years while the product is stocked on the shelf.

Since the latch lever 15 is maintained in the state of FIG. 3 by the above-described operations, the electric power supply to the above-described clock and the portion of the microcomputer within the control circuit 23 is not disconnected.

As described above, the power-supply switch 22 is not operated again within normal use of the camera.

However, when a user wants to store the camera in a dark place for a long time, the user can return the powersupply switch 22 to the unused state using a paper clip, the tip of a nail, or the like (although in such a case, it is necessary to again adjust the clock and the like).

Figure 6:
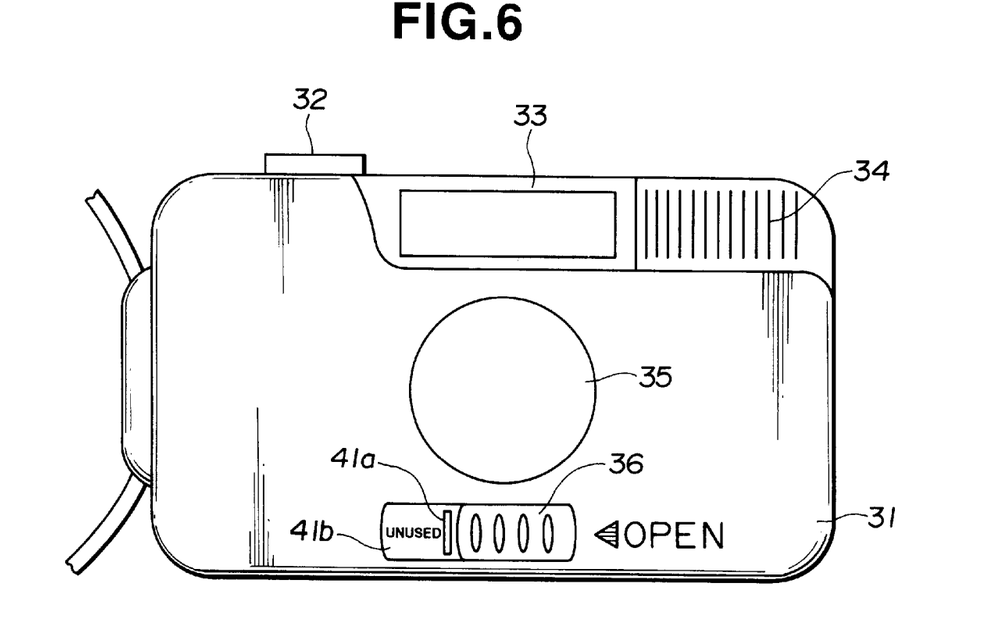
FIG. 6 is a front view illustrating a camera, serving as an electronic apparatus, according to a second embodiment of the present invention.

In FIG. 6, a main body 31 of the camera includes a shutter-release button 32, a finder window 33, a stroboscopic-lamp window 34, a lens barrel unit (or a lens cover unit) 35, and an operation member 36 (for opening/closing the cover), which slides. A solar battery (not shown) is disposed at the back of the camera. As in the above-described first embodiment, energy generated by the solar battery is stored in a lithium-ion secondary battery (not shown).

Figure 7:
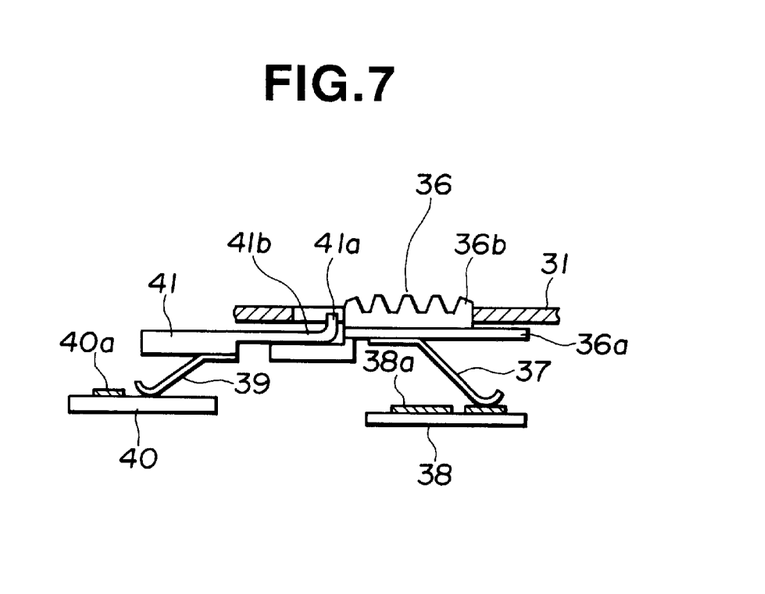
FIG. 7 is a side view illustrating the structure of a main switch and a power-supply switch of the camera shown in FIG. 6.

As shown in FIG. 7, the operation member 36 comprises a base unit 36a and an operation unit 36b operated by the user. Upon being operated by the photographer, the operation unit 36b is slid toward the right and the left in FIG. 7. A switch armature 37 is fixed on the base unit 36a of the operation member 36. FIG. 7 illustrates a state in which a photographing operation is not ready. By sliding the switch armature 37 toward the left from this state to provide a conducting state with a pattern portion 38a of a switch substrate 38, the camera assumes a standby state (a state in which a photographing operation is ready). That is, the operation member 36, the armature 37 and the switch substrate 38 comprise a main switch.

Reference numeral 41 represents a latch member. When the operation member 36 is slid toward the left in FIG. 7, a projection 41a of the latch member 41, which protrudes outwardly, is pushed by the operation member 36, so that the latch member 41 is also slid toward the left. A switch armature 39 is fixed on the latch member 41. If the latch member 41 is slid toward the left by the operation member 36 from the state of FIG. 7, a conducting state is provided between the switch armature 39, which is held by a member (not shown) in this state, and a pattern portion 40a of a switch substrate 40, so that electric power is supplied to a control circuit (not shown) of the camera. That is, the latch member 41, the armature 39, and the switch substrate 40 comprise a power-supply switch.

After the latch member 41 has first been slid toward the left (after the power-supply switch has been first switched on), it is held at the slid position by the above-described member. Accordingly, even if the operation member 36 is returned to the state of FIG. 7 (even if the main switch is switched off), the state of the latch member 41 is maintained, so that, as in the case of the first embodiment, electric power supply to the control circuit is not disconnected thereafter.

The projection 41a of the latch member 41 enables a user to forcedly return the latch member 41 to the initial state using his finger nail when the user intends to keep the camera in a dark place for a long time.

As shown in FIG. 6, on a portion of a base 41b of the latch member 41 exposed because the operation member 36 has not yet been operated after the camera by the user, a legend, such as "UNUSED", indicating that the camera has not yet been used, is shown in red letters or the like.

Figure 8:
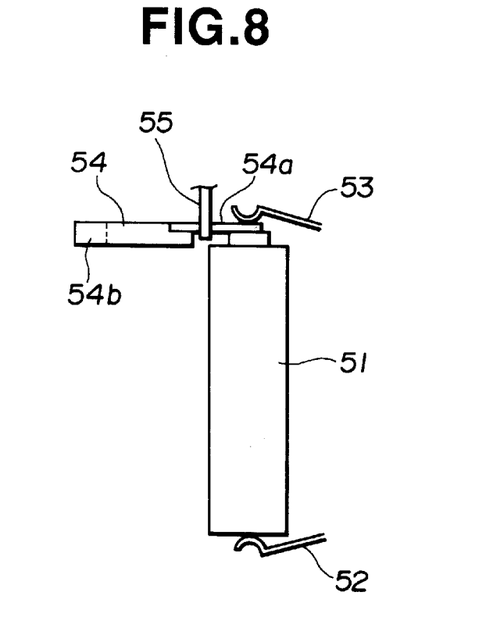
FIG. 8 is a side view illustrating the configuration of a principal portion of an electronic apparatus according to a third embodiment of the present invention.

FIG. 8 is a diagram illustrating the structure of a battery chamber of an apparatus, as seen from the side, according to a third embodiment of the present invention.

In FIG. 8, there is shown a battery 51, comprising at least one of a primary battery and a secondary battery, a negative-electrode armature 52, and a positive-electrode armature 53. A latch member 54 including an insulating member 54b is inserted between the positive electrode of the battery 51 and the positive-electrode armature 53. The entire latch member 54, except the insulating member 54a (inserted between the positive-electrode armature 53 and the battery 51) is a leaf-spring structure, and is fixed to a main body (not shown) at the end portion 54b of latch member 54. Reference numeral 55 represents an acting member which is a portion of the above-described main switch.

In the above-described configuration, if the user first takes out the apparatus from the packing box and switches on the main switch, the acting member 55, integrated with the main switch, pushes the insulating member 54a of the latch member 54 toward the back of the plane of FIG. 8 to remove the insulating member 54a from between the positive-electrode armature 53 and the battery 51, so that the positive-electrode armature 53 contacts the battery 51.

Even if the standby switch returns to the original switched-off state thereafter, the insulating member 54a only contacts the side of the positive-electrode armature 53 and does not return to the state of FIG. 8, and electric power continues to be supplied, while the acting member 55 returns to the state of FIG. 8.

In the present embodiment, a combination of a solar battery and a secondary battery may be adopted. In such a case, however, charging from the solar battery is also prevented. Accordingly, the present embodiment is more suitable for an apparatus which incorporates a primary battery.

However, the present embodiment may be favarably applied to the above-described lithium-ion secondary battery, because this battery has a shelf-life of a few years, and the above-described structure can be integrated with a structural member and therefore the production costs can be greatly reduced.

Figure 9:
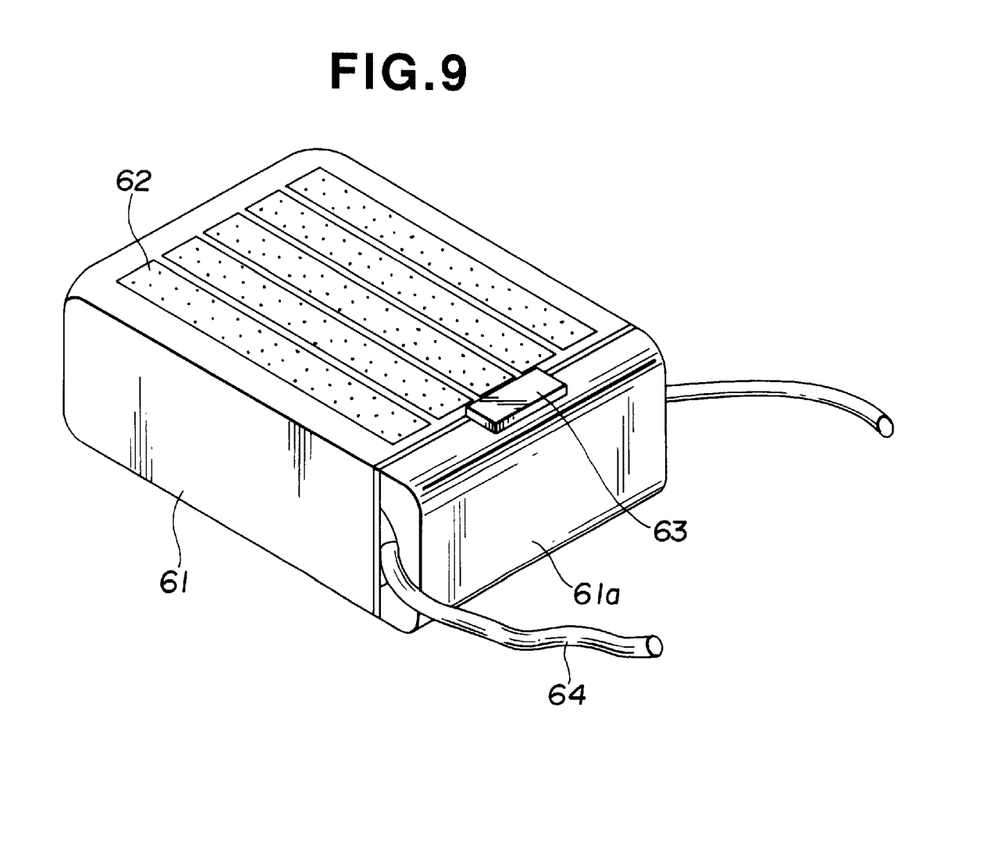
FIG. 9 is a perspective view illustrating an electronic apparatus according to a fourth embodiment of the present invention.

FIG. 9 is a perspective view of an electronic apparatus according to a fourth embodiment of the present invention.

In FIG. 9, a solar battery 62 is provided on the surface of a case 61. The solar battery 62 contacts a secondary battery of an apparatus incorporated in the case 61 with an armature (not shown). The incorporated apparatus is taken out while disconnecting the connection by opening/closing a cover 61a after releasing a catch 63. Reference numeral 64 represents a strap.

In this embodiment, the apparatus itself does not include the solar battery, but the case for accommodating the apparatus includes the solar battery. The present embodiment differs from the above-described embodiment only in this aspect, but has the same configuration in other aspects.

The above-described fourth embodiment is featured in that in an apparatus carried by the user while accommodating it in the case 61, the apparatus can be charged even while it is being carried.

The above-described emodiments have the following advantages:

1) By providing a switch for disconnecting electric power supply from a power supply to a circuit until an apparatus reaches a user, the electric power of a battery is not substantially reduced even if the apparatus is stored for a long time.

2) Since a solar battery and a secondary battery are connected to each other independent of the switch, electric power generated by the solar battery is stored in the secondary battery.

3) Since the safety circuit (the overvoltage/overcurrent protection circuit 20 shown in FIG. 4) operates in the state of advantage 2), no problem arises in the safety of the apparatus.

4) The switch is released by performing a standby operation of the user without having particular knowledge, the operability of the apparatus is excellent. That is, the electric power supply from the battery to the circuit is automatically started by performing a routine operation, such as opening a hatch barrier of a camera, opening a back cover, switching on a main switch, or the like, without performing a particular initializing operation (such as loading a battery after opening a battery cover, removing insulating paper, or the like).

5) Since it is possible to use another switch also as a substrate, or to use a portion of the main body to provide the above-described insulation material as in the third embodiment, an inexpensive apparatus can be provided.

6) By providing a packing box as shown in FIG. 5, the solar battery is optically exposed even in a packed state. Hence, energy is stored in the secondary battery whenever necessary.

7) By providing a power-supply switch as in the second embodiment (by providing the projection 37a on the latch member 37), the switch can be operated again while the apparatus is stored for a long time.

Accordingly, it is possible to provide a packing box in which even if a secondary battery performs self discharge while the apparatus is stored on the shelf for a long time, a solar battery can charge the secondary battery so as to supplement the discharged power.

Although the above-described embodiments have been described with respect to a camera, the present invention is not limited to a camera, but can be widely applied to any electronic apparatus which uses a battery.

The present invention may be applied to a case in which the entirety or a portion of the configuration of a claim or an embodiment comprises a single apparatus, or is combined with another apparatus, or comprises a component which constitutes an apparatus.

The individual components shown in schematic or block form in the drawings are all well known in the electronic arts, including the camera arts, and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus adapted for use with a battery, said apparatus being convertible from an initial state to an operable state, said apparatus comprising:

a control device that converts the apparatus from the initial state to the operable state and controls electrical contact between said apparatus and the battery in the initial state and in the operable state, wherein when the apparatus is in the initial state said control device prevents electrical contact between said apparatus and the battery, wherein said control device converts the apparatus from the initial state to the operable state in response to an operation relating to use of said apparatus, and wherein when the apparatus is in the operable state said control device selectively provides electrical contact between said apparatus and the battery or prevents electrical contact between said apparatus and the battery.

2. An apparatus according to claim 1, wherein said apparatus comprises a camera.

3. An apparatus according to claim 1, wherein the operation relating to use of said apparatus comprises opening a cover of said apparatus.

4. An apparatus according to claim 1, wherein the battery comprises a lithium-ion chargeable battery.

5. An apparatus according to claim 1, further comprising switching means for switching said apparatus to an operable state.

6. An apparatus according to claim 5, further comprising operation means for operating said switching means from the outside of said apparatus.

7. An apparatus according to claim 1, further comprising a solar cell for charging the battery while said control device prevents electrical contact between said apparatus and the battery.

8. An apparatus according to claim 7, further comprising overcharge prevention means for preventing overcharging by said solar cell.

9. An apparatus according to claim 7, further comprising means for packing said apparatus in a state in which external light passes through said packing and is incident on said solar cell.

10. An apparatus adapted for use with a chargeable unit charged by a solar cell, said apparatus comprising:

a control device that prevents electrical contact between an operation circuit of said apparatus and the solar cell in an initial state in which the chargeable unit can be charged by the solar cell and which causes electrical contact between the operation circuit and the solar cell in a power on state, said control device changing to the power on state from the initial state in response to an operation relating to use of said apparatus, and thereafter releasably maintaining the power on state independently of the operation relating to use of said apparatus.

11. An apparatus according to claim 10, wherein said control device comprises a switch.

12. An apparatus according to claim 10, further comprising a light transmitting portion positioned to transmit external light therethrough to the solar cell when said apparatus is packed.

13. An apparatus according to claim 10, wherein the chargeable unit comprises a lithium-ion chargeable battery.

14. A packing device in combination with an apparatus using energy provided by a solar cell, said combination comprising:

an apparatus comprising:
an operation circuit;
a solar cell;
a chargeable unit connected to said solar cell; and
a connecting device that electrically connects and disconnects said operation circuit and said solar cell; and a packing container comprising a light transmissive portion positioned so as to transmit external light therethrough to said solar cell when said apparatus is packed in said packing container, wherein said chargeable unit is charged by said solar cell when said connecting device disconnects said operation circuit and said solar cell in the presence of external light when said apparatus is packed in said packing container, and wherein said connecting device electrically connects said operation circuit and said solar cell in response to an operation relating to use of said apparatus and thereafter maintains the electrical connection between said operation circuit and said solar cell independently of the operation relating to use of said apparatus.

15. A device according to claim 14, wherein said light transmissive portion comprises a transparent member that transmits external light to said solar cell.

16. An apparatus adapted for use with a battery, said apparatus being convertible from an initial state to an operable state, said apparatus comprising:

a control device that controls electrical contact between said apparatus and the battery in the initial state and in the operable state, said control device comprising means including a member movable inside the apparatus for converting the apparatus from the initial state to the operable state in response to an operation relating to use of said apparatus, wherein when the apparatus is in the initial state said control device prevents electrical contact between said apparatus and the battery, and wherein when the apparatus is in the operable state said control device selectively provides electrical contact between said apparatus and the battery or prevents electrical contact between said apparatus and the battery.

17. An apparatus according to claim 16, wherein said apparatus comprises a camera.

18. An apparatus according to claim 16, wherein the operation relating to use of said apparatus comprises opening a cover of said apparatus.

19. An apparatus according to claim 16, wherein the battery comprises a lithium-ion chargeable battery.

20. An apparatus according to claim 16, further comprising switching means for switching said apparatus to an operable state.

21. An apparatus according to claim 20, further comprising operation means for operating said switching means from the outside of said apparatus.

22. An apparatus according to claim 16, further comprising a solar cell for charging the battery while said control device prevents electrical contact between said apparatus and the battery.

23. An apparatus according to claim 22, further comprising overcharge prevention means for preventing overcharging by said solar cell.

24. An apparatus according to claim 22, further comprising means for packing said apparatus in a state in which external light passes through said packing and is incident on said solar cell.

25. An apparatus having an operation circuit and adapted for use with a chargeable unit charged by a solar cell, said apparatus comprising:

a changing device that changes between a first state that prevents electrical contact between the operation circuit of said apparatus and the solar cell, in which first state the chargeable unit can be charged by the solar cell, and a second state that causes electrical contact between the operation circuit and the solar cell, in which second state the chargeable unit can be charged by the solar cell.

26. An apparatus according to claim 25, wherein said changing device comprises a switch.

27. An apparatus according to claim 25, wherein said changing device comprises a linkage device that changes said changing device from the first state to the second state in response to an operation relating to use of said apparatus.

28. An apparatus according to claim 25, further comprising a light transmitting portion positioned to transmit external light therethrough to the solar cell when said apparatus is packed.

29. An apparatus according to claim 25, wherein the chargeable unit comprises a lithium-ion chargeable battery.

30. An apparatus adapted for use with a battery, said apparatus comprising:

an operation member movable by a user between an inoperable state and an operable state; and a movable member movable between a first position in the apparatus, in which first position said movable member does not cause electrical contact between the battery and the apparatus, and a second position in the apparatus, in which second position the battery does cause electrical contact between the battery and the apparatus, wherein movement of said operation member from the inoperable state to the operable state in an initial use of said apparatus causes said movable member to move from the first position to the second position, and subsequent movement of said operation member does not cause any movement of said movable member.

31. An apparatus according to claim 30, wherein said apparatus comprises a camera.

32. An apparatus according to claim 30, wherein said operation member comprises a protective cover for opening and closing said apparatus.

33. An apparatus according to claim 30, wherein said operation member comprises a protective cover and a member for opening and closing said protective cover.

34. An apparatus according to claim 30, further comprising a main switch, and wherein said operation member comprises a member for turning on and turning off said main switch.

35. An apparatus according to claim 30, wherein said moveable member comprises electrical contacts that electrically connect the apparatus and the battery when said movable member is in the second position and that do electrically connect the apparatus and the battery when said moveable member is in the first position.

\* \* \* \* \*

UNITED STATES PATENT AND TRADEMARK OFFICE
CERTIFICATE OF CORRECTION

PATENT NO. : 6,044,230
DATED : March 28, 2000
INVENTOR(S): TAKAYUKI TSUBOI

It is certified that error appears in the above-identified patent and that said Letters Patent is hereby corrected as shown below:

<u>At [56] References Cited</u>

"Lyhan" should read --Lynam--.

<u>Column 1</u>

Line 31, "orinary" should read --ordinary--.
Line 33, "consumed" should read --is consumed--; and "User is." should read --user.--.

<u>Column 3</u>

Line 20, "conver" should read --cover--.

UNITED STATES PATENT AND TRADEMARK OFFICE
CERTIFICATE OF CORRECTION

PATENT NO. : 6,044,230

DATED : March 28, 2000

INVENTOR(S): TAKAYUKI TSUBOI

It is certified that error appears in the above-identified patent and that said Letters Patent is hereby corrected as shown below:

COLUMN 7

Line 66, "37a" should read --41a--.

Column 8

Line 1, "37)," should read --41)--.

Signed and Sealed this

Third Day of April, 2001

Attest:

NICHOLAS P. GODICI

Attesting Officer     Acting Director of the United States Patent and Trademark Office